US012641132B2

(12) United States Patent
Merino Vazquez et al.

(10) Patent No.: US 12,641,132 B2
(45) Date of Patent: May 26, 2026

(54) METHODS AND APPARATUSES FOR SELECTING A MEDIA RESOURCE FUNCTION OR A MEDIA GATEWAY IN AN INTERNET PROTOCOL SESSION

(71) Applicant: Telefonaktiebolaget LM Ericsson (publ), Stockholm (SE)

(72) Inventors: Emiliano Merino Vazquez, Madrid (ES); Susana Fernandez Alonso, Madrid (ES); Jesús Ángel De Gregorio Rodriguez, Madrid (ES); Miguel Angel Muñoz De La Torre Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 297 days.

(21) Appl. No.: 18/285,241

(22) PCT Filed: Mar. 31, 2022

(86) PCT No.: PCT/EP2022/058722
§ 371 (c)(1),
(2) Date: Sep. 30, 2023

(87) PCT Pub. No.: WO2022/214394
PCT Pub. Date: Oct. 13, 2022

(65) Prior Publication Data
US 2024/0187459 A1      Jun. 6, 2024

(30) Foreign Application Priority Data
Apr. 5, 2021    (EP) ..................................... 21382282

(51) Int. Cl.
*H04L 12/00*          (2006.01)
*H04L 65/1023*       (2022.01)
(Continued)

(52) U.S. Cl.
CPC ...... *H04L 65/1026* (2013.01); *H04L 65/1045* (2022.05); *H04L 65/1069* (2013.01); *H04L 65/1073* (2013.01); *H04L 65/1104* (2022.05)

(58) Field of Classification Search
CPC ............. H04L 65/1026; H04L 65/1045; H04L 65/1069; H04L 65/1073; H04L 65/1104; H04L 65/1016; H04L 65/104; H04L 65/80
(Continued)

(56) References Cited

U.S. PATENT DOCUMENTS 9,854,005 B2 * 12/2017 Lu ........................ H04L 65/1073
10,582,061 B2 * 3/2020 Mahdi ................... H04M 7/006
(Continued)

FOREIGN PATENT DOCUMENTS

EP          2037650 B1 *  9/2010   ......... H04L 65/1016
WO     WO-2020121024 A1 *  6/2020   ......... H04L 65/1016
(Continued)

OTHER PUBLICATIONS

International Search Report and Written Opinion of the International Searching Authority, PCT/EP2022/058722, mailed Jun. 29, 2022, 17 pages.
(Continued)

*Primary Examiner* — Frantz Coby
(74) *Attorney, Agent, or Firm* — Sage Patent Group

(57) ABSTRACT

Embodiments described herein relate to methods and apparatuses for enabling selection of a media resource function or a media gateway in an IP session. A method in a Proxy Call Session Control Function, P-CSCF, includes receiving one or more Session Initiation Protocol, SIP, packets originating from a wireless device as part of the IP session; responsive to receiving the SIP packets, transmitting a request to a Policy Control Function, PCF, for an indication
(Continued)

of a geographical service area for a User Plane Function, UPF associated with the IP session; receiving an indication of the geographical service area; and selecting a gateway node based on the geographical service area.

17 Claims, 18 Drawing Sheets

(51) Int. Cl.
    *H04L 65/1045*      (2022.01)
    *H04L 65/1069*      (2022.01)
    *H04L 65/1073*      (2022.01)
    *H04L 65/1104*      (2022.01)

(58) Field of Classification Search
    USPC ........................................................ 370/310
    See application file for complete search history.

(56)                References Cited

U.S. PATENT DOCUMENTS

2014/0325078 A1* 10/2014 Shan ................. H04W 36/0066
                                                  709/227

2017/0134438 A1* 5/2017 Lu ........................ H04L 65/1045
2018/0048766 A1* 2/2018 Mahdi ................... H04W 84/12

FOREIGN PATENT DOCUMENTS

WO     WO-2021001051 A1 * 1/2021 ........... H04L 47/125
WO     WO-2021090077 A1 * 5/2021 ......... H04L 65/1033

OTHER PUBLICATIONS

Huawei et al., "Solution for IMS traffic local routing," SA WG2 Meeting #126, S2-182979 (revision of S2-182177, S2-182359); Feb. 26-Mar. 2, 2018, Montreal, Canada, 3 pages.
3GPP TR 23.700-12 V0.3.0 (Mar. 2021); 3rd Generation Partnership Project; Technical Specification Group Core Network and Terminals; Study on enhanced IP Multimedia Subsystem (IMS) to 5GC integration Phase 2; CT WG4 aspects (Release 17), 13 pages.
Japanese Notice of Allowance for Japanese Patent Application No. 2023-558291, dated Oct. 15, 2024, 3 pages.
NTT Docomo, "Resolving Editor's Note on NF Service Set," 3GPP TSG-SA2 Meeting #132, S2-1902960, Xi'an, China, Apr. 8-12, 2019, 11 pages.

* cited by examiner

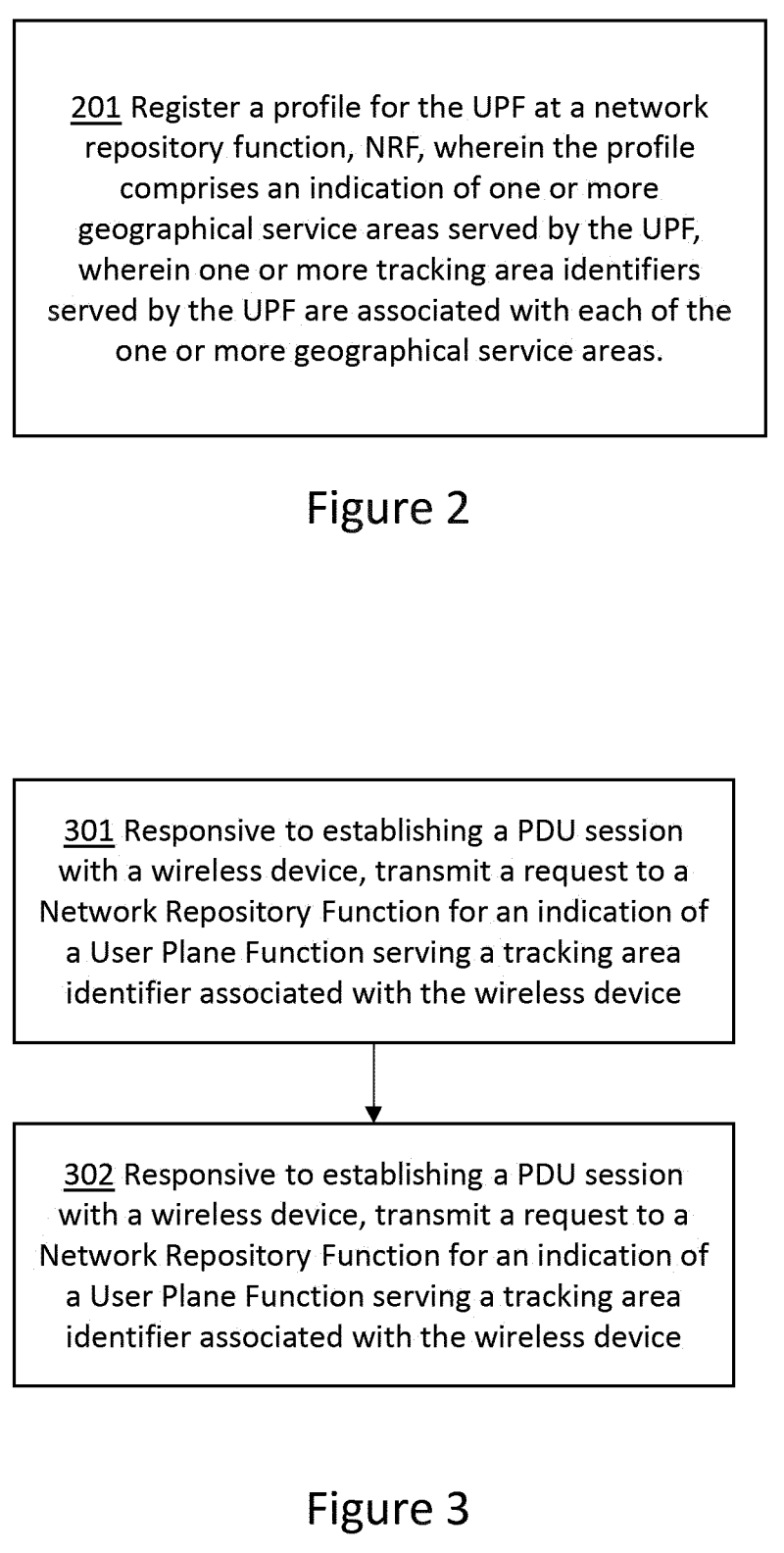

201 Register a profile for the UPF at a network repository function, NRF, wherein the profile comprises an indication of one or more geographical service areas served by the UPF, wherein one or more tracking area identifiers served by the UPF are associated with each of the one or more geographical service areas.

Figure 2

301 Responsive to establishing a PDU session with a wireless device, transmit a request to a Network Repository Function for an indication of a User Plane Function serving a tracking area identifier associated with the wireless device 302 Responsive to establishing a PDU session with a wireless device, transmit a request to a Network Repository Function for an indication of a User Plane Function serving a tracking area identifier associated with the wireless device

Figure 3

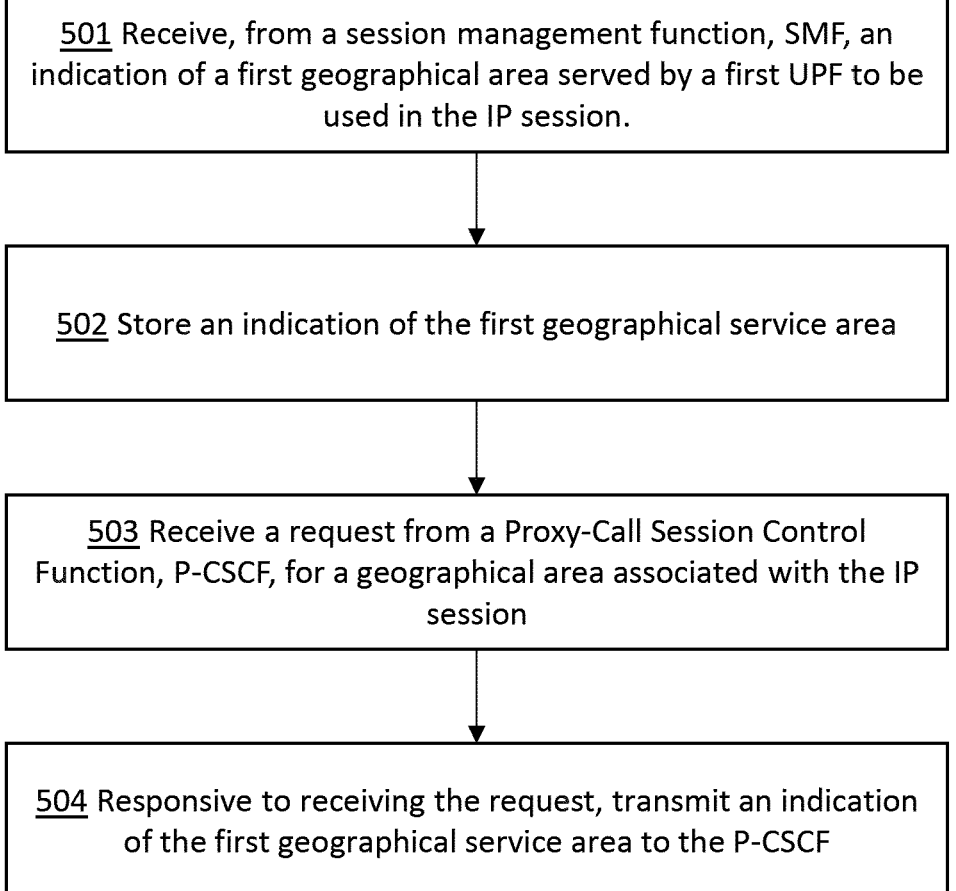

501 Receive, from a session management function, SMF, an indication of a first geographical area served by a first UPF to be used in the IP session.

502 Store an indication of the first geographical service area

503 Receive a request from a Proxy-Call Session Control Function, P-CSCF, for a geographical area associated with the IP session 504 Responsive to receiving the request, transmit an indication of the first geographical service area to the P-CSCF

Figure 4

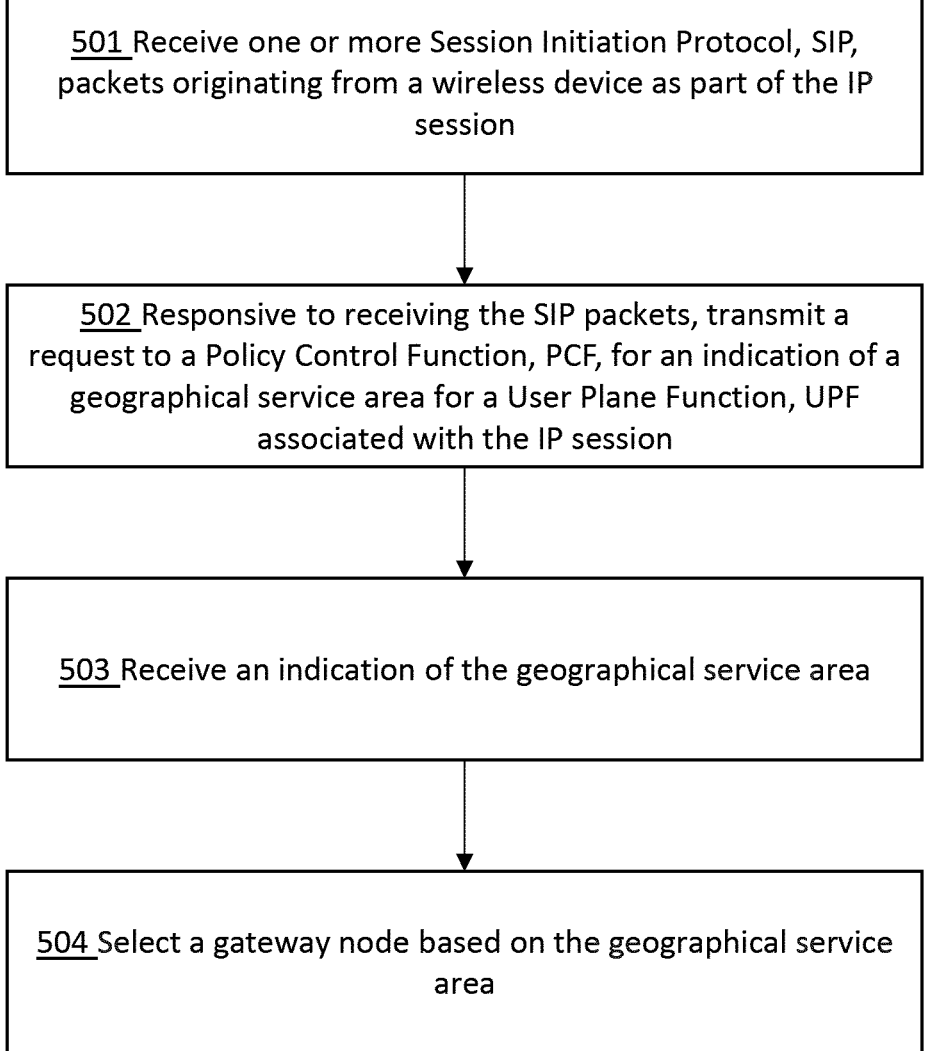

501 Receive one or more Session Initiation Protocol, SIP, packets originating from a wireless device as part of the IP session 502 Responsive to receiving the SIP packets, transmit a request to a Policy Control Function, PCF, for an indication of a geographical service area for a User Plane Function, UPF associated with the IP session 503 Receive an indication of the geographical service area 504 Select a gateway node based on the geographical service area

Figure 5

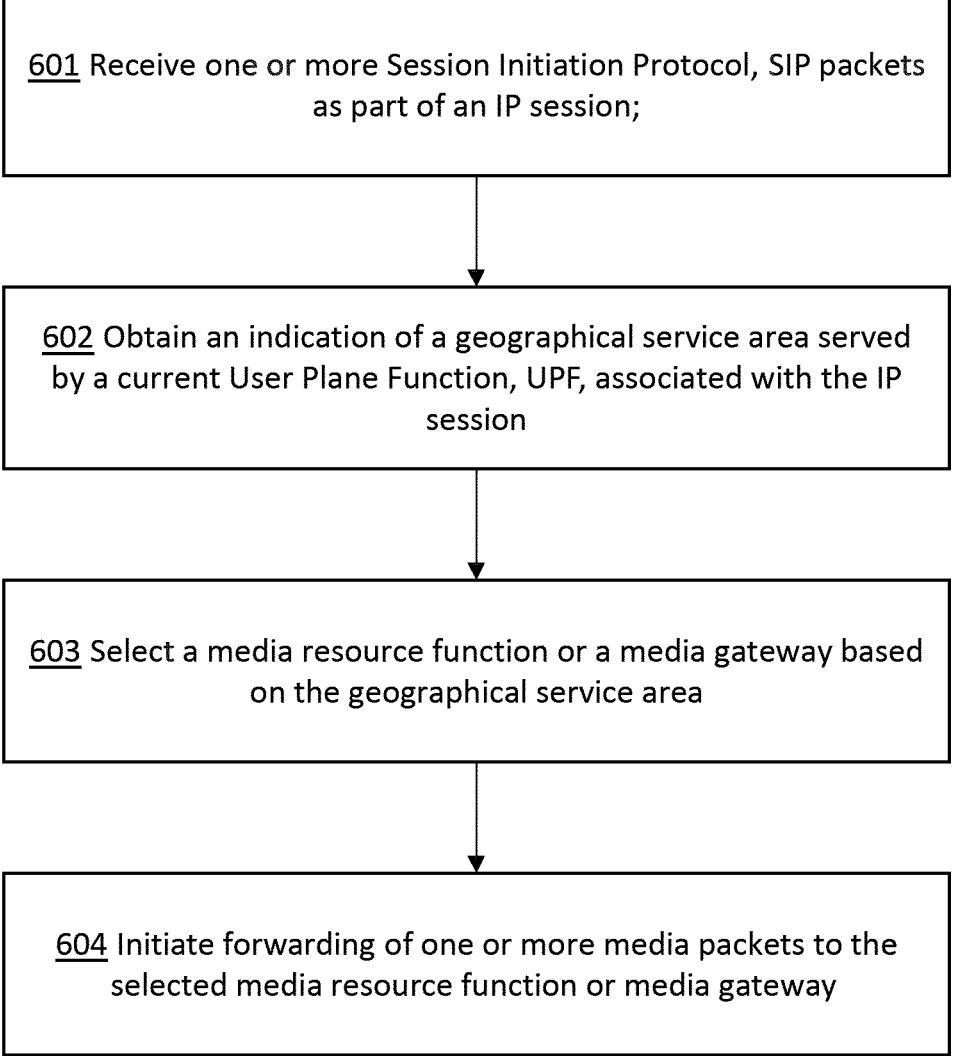

601 Receive one or more Session Initiation Protocol, SIP packets as part of an IP session;

602 Obtain an indication of a geographical service area served by a current User Plane Function, UPF, associated with the IP session 603 Select a media resource function or a media gateway based on the geographical service area 604 Initiate forwarding of one or more media packets to the selected media resource function or media gateway

Figure 6

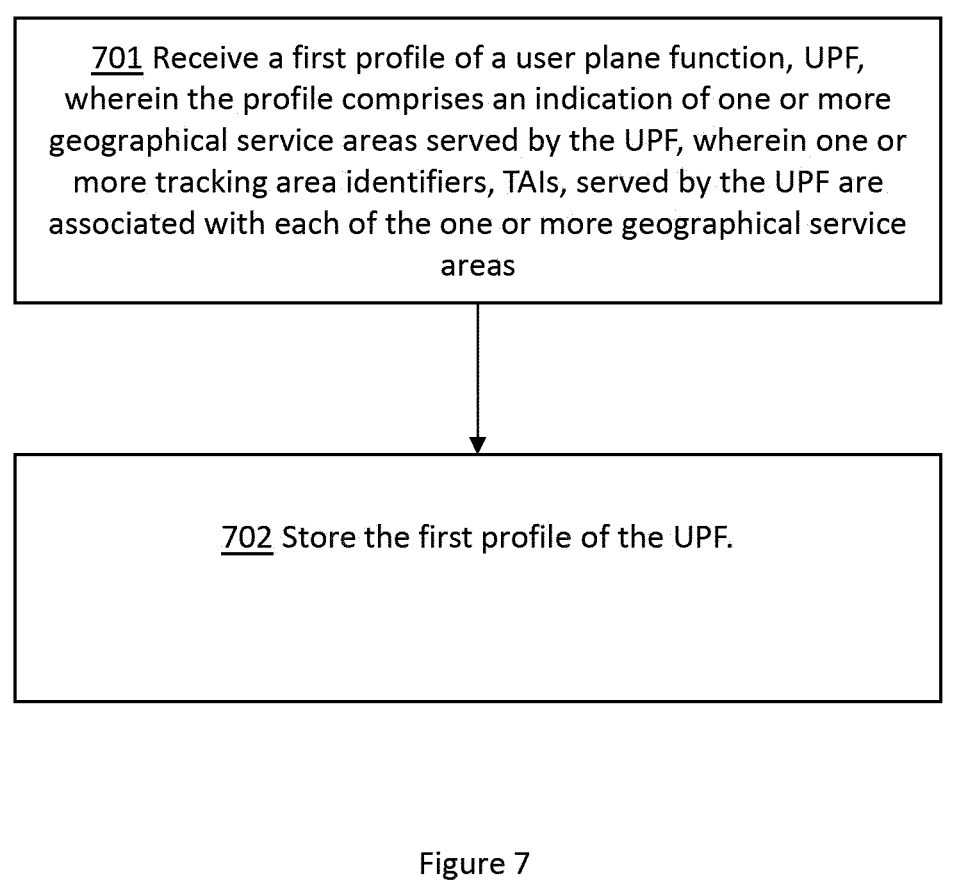

701 Receive a first profile of a user plane function, UPF, wherein the profile comprises an indication of one or more geographical service areas served by the UPF, wherein one or more tracking area identifiers, TAIs, served by the UPF are associated with each of the one or more geographical service areas 702 Store the first profile of the UPF.

Figure 7

METHODS AND APPARATUSES FOR SELECTING A MEDIA RESOURCE FUNCTION OR A MEDIA GATEWAY IN AN INTERNET PROTOCOL SESSION

CROSS REFERENCE TO RELATED APPLICATIONS

This application is a 35 U.S.C. § 371 national stage application of PCT International Application No. PCT/EP2022/058722 filed on Mar. 31, 2022, which in turn claims foreign priority to European Patent Application No. 21382282.8, filed on Apr. 5, 2021, the disclosures and content of which are incorporated by reference herein in their entirety.

TECHNICAL FIELD

Embodiments described herein relate to methods and apparatuses for enabling selection of a media resource function or a media gateway in an IP session. In particular, the methods and embodiments described herein select a media resource function or a media gateway based on a geographical service area associated with the UPF servicing the IP session.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Internet Protocol (IP) Multimedia Subsystem (IMS) architecture is defined in 3GPP TS 23.228. The IMS architecture can interwork with EPC and 5GC when it comes to Multimedia Telephony (e.g. VOLTE). In Multimedia Telephony, there are different user plane functions in charge of managing the voice/video traffic/IP packets (e.g. Real-time Transport Protocol (RTP) packets). These functions are placed in different hops in the network and are selected by different IMS functions, e.g. a Proxy Call Session Control Function (P-CSCF) selects an access media gateway (A-MGW/ATGW) so that the voice media sent by the user's equipment (UE) traverse this gateway; Media Gateway Control Function (MGCF) also selects a Media Gateway (MGW or IM-MGW) when interworking with the circuit switched domain. Additionally, when voice media or announcements are to be sent from the network, the IP Multimedia Subsystem Application Server (IMS-AS) (acting has MRFC, media resource function controller) can select an MRFP (media resource function processor) which, similarly to MGWs, can manage the voice packets in the uplink and downlink direction (i.e. from/to the UE).

An ongoing 3GPP study has described a potential alternative to select the optimal functions based on the user plane function (UPF) instance selected (e.g. UPF Id), see Sol #1: Conveying UPF FQDN to IMS nodes (related to Key issue #1: Routing of IMS traffic via a localized UPF) in Section 6.1.1 in 3GPP study 23.700-12 (reference 1), in which the UPF instance is conveyed to an IMS node via HSS/UDM/CSCF at registration of the wireless device. This UPF instance is used by the different IMS NFs as an input to select the optimal MGW/MRF (closer to the UPF) so that the voice/video latency is optimal. However, the proposed solution in the 3GPP study has multiple drawbacks:

The UPF id is the one selected at IMS registration, not when the UE initiates a voice/video call. The UE might move into a different area (e.g. UPF re-selection procedure might be triggered resulting in a different UPF instance for the Protocol Data Unit (PDU) session since the IMS registration took place, so in reality this might not be the UPF instance handling the UE's PDU session when the voice/video call is initiated.

It impacts IMS domain diameter legacy protocols (e.g. Cx, Sh), which are soon to be deprecated in favor of SBI (HTTP protocol)

It impacts the Serving Call Session Control Function (S-CSCF)/Home Subscriber Server (HSS)/Unified Data Management (UDM), which are not IMS functions controlling the user plane NFs (i.e. Media Gateways (MGWs)) so, it is not desirable at all to impact NFs which are not managing voice/media (at the user plane level) at all.

It impacts the configuration in IMS nodes in a non-scalable way, since every time a new UPF in instantiated in the network, the different IMS nodes would need to be reconfigured with the new UPF id when it comes to select the Media Gateways (MGWs)/Media Resource Function (MRFs). In large networks, multiple UPFs serve the same geographical areas, so in reality it does matter to have one or ten UPFs in the same area, the MGWs/MRFs selection will not be impacted by the amount of UPF instances Ids in the same area. IMS nodes should be transparent to the scalability of UPFs within the same geographical area.

FIG. 1A-1B illustrates the problem of selecting a MGW/MRF instance based on the UE location without taking into account the current UPF in use for the PDU session.

For example, in step 1 of FIG. 1A, the voice media packets are transmitted from a UE in a south region to a UPF in a central region.

In step 2 of FIG. 1A the voice media packets are forwarded to an A-MGW via the P-CSCF-1. The P-CSCF-1 selects the A-MGW based on the location of the UE as received in the PANI header of the IP packets. So the IP packets are transmitted back to the south region from the central region unnecessarily.

SUMMARY

According to some embodiments there is provided a method in a Proxy-Call Session Control Function, P-CSCF, for selecting a gateway node for an IP session. The method comprises receiving one or more Session Initiation Protocol, SIP, packets originating from a wireless device as part of the IP session; responsive to receiving the SIP packets, transmitting a request to a Policy Control Function, PCF, for an indication of a geographical service area for a User Plane Function, UPF associated with the IP/PDU session; receiving an indication of the geographical service area; and selecting a media gateway node based on the geographical service area.

According to some embodiments there is provided a method in a first network function, wherein the first network function is acting as an IMS network function. The method comprises receiving one or more Session Initiation Protocol, SIP packets as part of an IP/PDU session; obtaining an indication of a geographical service area served by a current User Plane Function, UPF, associated with the IP/PDU session; selecting a media resource function or a media gateway based on the geographical service area of the current UPF; and forwarding the one or more SIP packets to the media resource function or the media gateway.

According to some embodiments there is provided a method in a Session Management Function, SMF, for enabling selection of a media resource function or a media gateway in an IP/PDU session. The method comprises responsive to establishing a PDU session with a wireless device, transmitting a request to a Network Repository Function for an indication of a User Plane Function serving a tracking area identifier associated with the wireless device; and responsive to transmitting the request, receiving an identification of at least one UPF and respective indications of geographical service areas served by the at least one UPF.

According to some embodiments there is provided a method in a Policy Control Function, PCF for enabling selection of a media resource function or a media gateway in an IP session. The method comprises receiving, from a session management function, SMF, an indication of a first geographical area served by a first UPF to be used in the IP session; storing an indication of the first geographical service area; receiving a request from a Proxy-Call Session Control Function, P-CSCF, for a geographical area of the current UPF associated with the IP session; and responsive to receiving the request, transmitting an indication of the first geographical service area to the P-CSCF.

According to some embodiments there is provided a method in a user plane function, UPF, for enabling selection of a media resource function or a media gateway in an IP session. The method comprises registering a profile for the UPF at a network repository function, NRF, wherein the profile comprises an indication of one or more geographical service areas served by the UPF, wherein one or more tracking area identifiers served by the UPF are associated with each of the one or more geographical service areas.

According to some embodiments there is provided a method in a network repository function, NRF, for enabling selection of a media resource function or a media gateway in an IP session. The method comprises receiving a first profile of a user plane function, UPF, wherein the profile comprises an indication of one or more geographical service areas served by the UPF, wherein one or more tracking area identifiers, TAIs, served by the UPF are associated with each of the one or more geographical service areas; and storing the first profile of the UPF.

According to some embodiments there is provided a Proxy-Call Session Control Function, P-CSCF, for selecting a gateway node for an IP session. The P-CSCF comprises processing circuitry configured to: receive one or more Session Initiation Protocol, SIP, packets originating from a wireless device as part of the IP session; responsive to receiving the SIP packets, transmit a request to a Policy Control Function, PCF, for an indication of a geographical service area for a User Plane Function, UPF associated with the IP session; receive an indication of the geographical service area; and select a gateway node based on the geographical service area.

According to some embodiments there is provided a first network function, wherein the first network function is acting as an IMS network function. The first network function comprises processing circuitry configured to: receive one or more Session Initiation Protocol, SIP packets as part of an IP session; obtain an indication of a geographical service area served by a current User Plane Function, UPF, associated with the IP session; select a media resource function or a media gateway based on the geographical service area; and forward the one or more SIP packets to the media resource function or the media gateway.

According to some embodiments there is provided a Session Management Function, SMF, for enabling selection of a media resource function or a media gateway in an IP session. The SMF comprises processing circuitry configured to: responsive to establishing a PDU session with a wireless device, transmit a request to a Network Repository Function for an indication of a User Plane Function serving a tracking area identifier associated with the wireless device; and responsive to transmitting the request, receive an identification of at least one UPF and respective indications of geographical service areas served by the at least one UPF.

According to some embodiments there is provided Policy Control Function, PCF for enabling selection of a media resource function or a media gateway in an IP session. The PCF comprises processing circuitry configured to: receive, from a session management function, SMF, an indication of a first geographical area served by a first UPF to be used in the IP session; store an indication of the first geographical service area; receive a request from a Proxy-Call Session Control Function, P-CSCF, for a geographical area associated with the IP session; and responsive to receiving the request, transmit an indication of the first geographical service area to the P-CSCF.

According to some embodiments there is provided a user plane function, UPF, for enabling selection of a media resource function or a media gateway in an IP session. The UPF comprises processing circuitry configured to: register a profile for the UPF at a network repository function, NRF, wherein the profile comprises an indication of one or more geographical service areas served by the UPF, wherein one or more tracking area identifiers served by the UPF are associated with each of the one or more geographical service areas.

According to some embodiments there is provided a network repository function, NRF, for enabling selection of a media resource function or a media gateway in an IP session. The NRF comprises processing circuitry configured to: receive a first profile of a user plane function, UPF, wherein the profile comprises an indication of one or more geographical service areas served by the UPF, wherein one or more tracking area identifiers, TAIs, served by the UPF are associated with each of the one or more geographical service areas; and store the first profile of the UPF.

BRIEF DESCRIPTION OF THE DRAWINGS

For a better understanding of the embodiments of the present disclosure, and to show how it may be put into effect, reference will now be made, by way of example only, to the accompanying drawings, in which:

FIG. 2 illustrates a method in a user plane function, UPF, for enabling selection of a media resource function or a media gateway in an IP session;

FIG. 3 illustrates a method in a Session Management Function, SMF, for enabling selection of a media resource function or a media gateway in an IP session;

FIG. 4 illustrates method in a Policy Control Function, PCF for enabling selection of a media resource function or a media gateway in an IP session;

FIG. 5 illustrates a method in a Proxy-Call Session Control Function, P-CSCF, for selecting a gateway node for an IP session;

FIG. 6 illustrates a method in a first network function, wherein the first network function is acting as an IMS network function;

FIG. 7 illustrates method in a network repository function, NRF, for enabling selection of a media resource function or a media gateway in an IP session;

DESCRIPTION

Figure 1A:
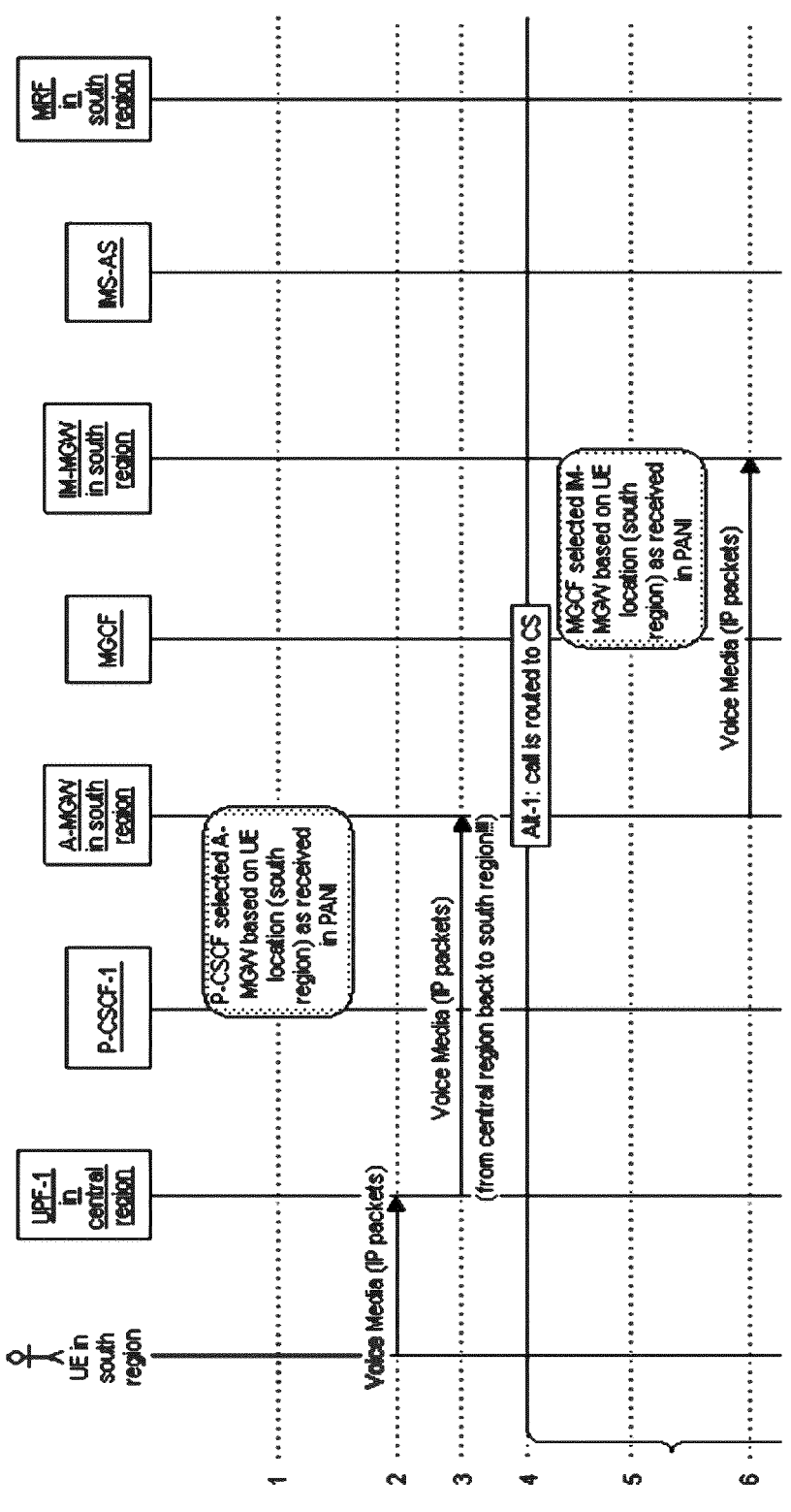
FIG. 1A-1B illustrates the problem of selecting a MGW/MRF instance based on the UE location without taking into account the current UPF in use for the PDU session.
Figure 1B:
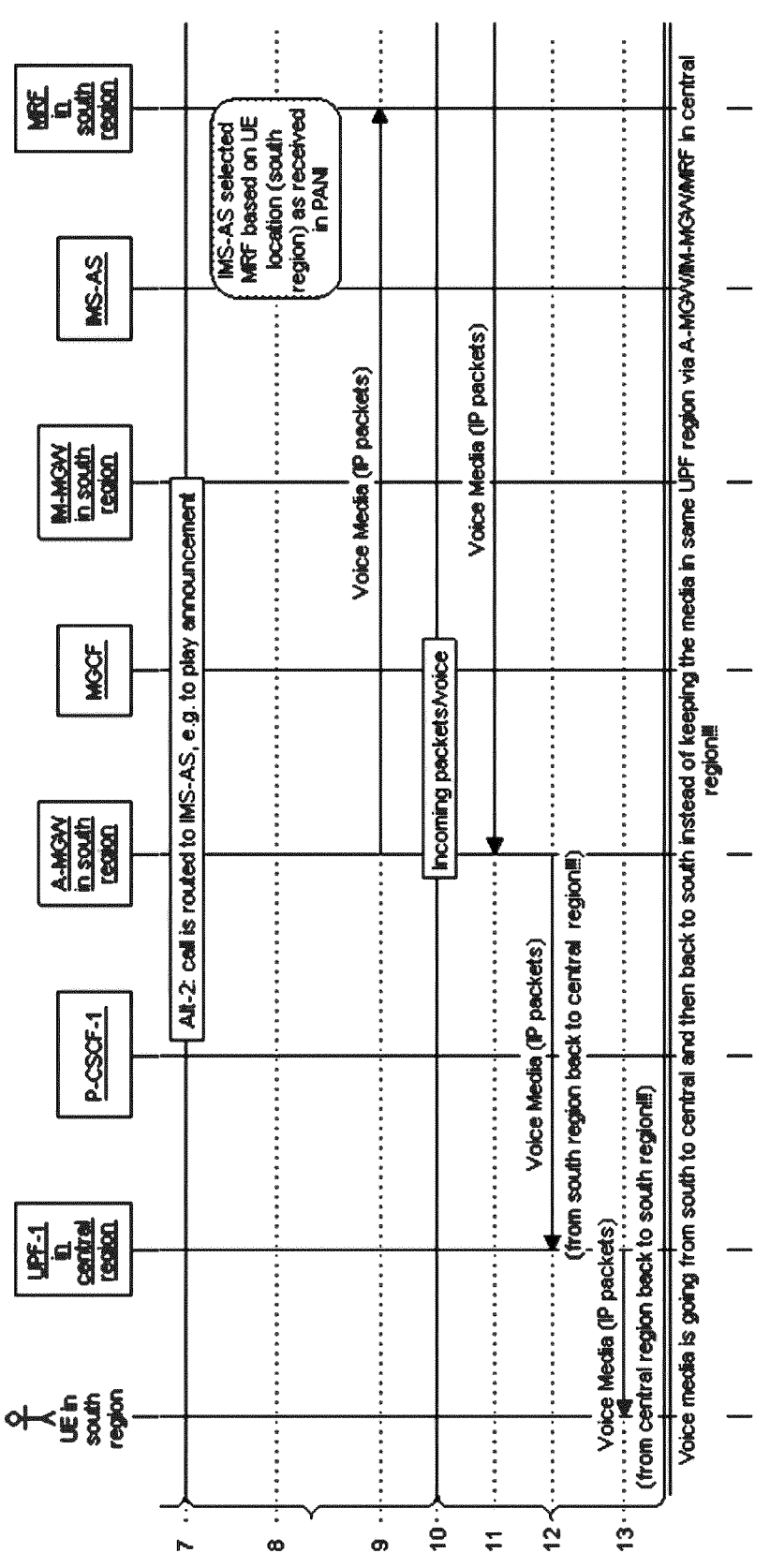

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

In embodiments described herein IP Multimedia Subsystem (IMS) nodes are provided with the user plane function (UPF) geographical service area (that is, the geographical area of the current UPF for the UE). This is done by enhancing the existing 5GC protocols/APIs. In embodiments described herein, the IMS nodes may only need to be aware of the geographical service areas of the current UPF, in order to select the optimal MGW/MRF to manage voice/video media.

FIG. 2 illustrates a method in a user plane function, UPF, for enabling selection of a media resource function or a media gateway in an IP session.

In step 201, the UPF registers a profile for the UPF at a network repository function, NRF, wherein the profile comprises an indication of one or more geographical service areas served by the UPF, wherein one or more tracking area identifiers served by the UPF are associated with each of the one or more geographical service areas.

In other words, a UPF registers in NRF with the tracking areas it serves. A given UPF instance might be primary/preferred for a set of TAIs in service area 1 and secondary/non-preferred for a set of TAIs in another neighbour service area. If this is the case, a given UPF may be considered as serving two different areas. In these examples, the UPF may register, for each set of TAIs, the service area to which the TAIs belong to.

FIG. 3 illustrates a method in a Session Management Function, SMF, for enabling selection of a media resource function or a media gateway in an IP session.

In step 301, the SMF, responsive to establishing a PDU session with a wireless device, transmits a request to a Network Repository Function for an indication of a User Plane Function serving a tracking area identifier associated with the wireless device.

In step 302, the SMF, responsive to transmitting the request, receives an identification of at least one UPF and respective indications of geographical service areas served by the at least one UPF.

The SMF may then select a UPF instance from the at least one UPF identification received in step 302 (based on the TAI where the UE is camping).

The SMF may then convey which UPF has been selected to the PCF at SM policy session establishment along with an indication of a geographical service area served by the selected UPF.

FIG. 4 illustrates method in a Policy Control Function, PCF for enabling selection of a media resource function or a media gateway in an IP session.

In step 401, the PCF receives, from a session management function, SMF, an indication of a first geographical area served by a first UPF to be used in the IP session.

In step 402, the PCF stores an indication of the first geographical service area. For example, the indication may be stored as part of the IP session.

In step 403, the PCF receives a request from a Proxy-Call Session Control Function, P-CSCF, for a geographical area associated with the IP session.

In step 404, the PCF, responsive to receiving the request, transmits an indication of the first geographical service area to the P-CSCF.

In some examples, the PCF may subscribe to a new event "UPF service area change". The subscription may be transmitted to the SMF which may inform the PCF if the UPF service area for the IP session changes, for example, if the UE moves area and a new UPF is selected.

FIG. 5 illustrates a method in a Proxy-Call Session Control Function, P-CSCF, for selecting a gateway node for an IP session.

In step 501, the P-CSCF receives one or more Session Initiation Protocol, SIP, packets originating from a wireless device as part of the IP session.

In step 502, the P-CSCF responsive to receiving the SIP packets, transmits a request to a Policy Control Function, PCF, for an indication of a geographical service area for a User Plane Function, UPF associated with the IP session. The request may be transmitted as part of AF policy authorization In step 503, the P-CSCF receives an indication of the geographical service area from the PCF.

In step 504, the P-CSCF selects a media gateway node based on the geographical service area of the UPF.

In some examples, the P-CSCF includes the geographical service area of the UPF in the P-Access-Network-Info (PANI) SIP header, so that the SIP request contains such info.

FIG. 6 illustrates a method in a first network function, wherein the first network function is acting as an IMS network function. For example, the first network function may comprise a P-CSCF, IMS-AS or a MGCF.

In step 601, the first NF receives one or more Session Initiation Protocol, SIP packets as part of an IP session.

In step 602, the first NF obtains an indication of a geographical service area served by a current User Plane Function, UPF, associated with the IP session.

In step 603, the first NF selects a media resource function or a media gateway based on the geographical service area.

In step 604, the first NF initiates forwarding of one or more media packets to the selected media resource function or the media gateway, for example by sending the IP address of the media resource function or a media gateway (e.g. via SIP protocol) to the UE, enabling the UE to communicate with the media resource function or the media gateway.

In other words, each IMS NF (e.g. P-CSCF, IMS-AS, MGCF) can make use of the UPF geographical service area indicated in the PANI to select (based on local configuration) the optimal MGW/MRF close to, or within, the geographical service area. The local configuration may have as many entries as UPF geographical service areas that exist, that is, regardless of the number of UPF instances in each geographical service area. Although the embodiments described herein are focused on 5GC SBI interfaces (e.g. N5), they may also be applied to Rx interface, since the PCF in 5GC may offer both interfaces (N5 and/or Rx). New diameter AVPs may be required in this case.

FIG. 7 illustrates method in a network repository function, NRF, for enabling selection of a media resource function or a media gateway in an IP session In step 701, the NRF receives a first profile of a user plane function, UPF, wherein the profile comprises an indication of one or more geographical service areas served by the UPF, wherein one or more tracking area identifiers, TAIs, served by the UPF are associated with each of the one or more geographical service areas.

In step 702, the NRF stores the first profile of the UPF.

FIG. 8A-8E is a signalling diagram illustrating an example implementation of the methods of FIGS. 2 to 7.

Figure 8A:
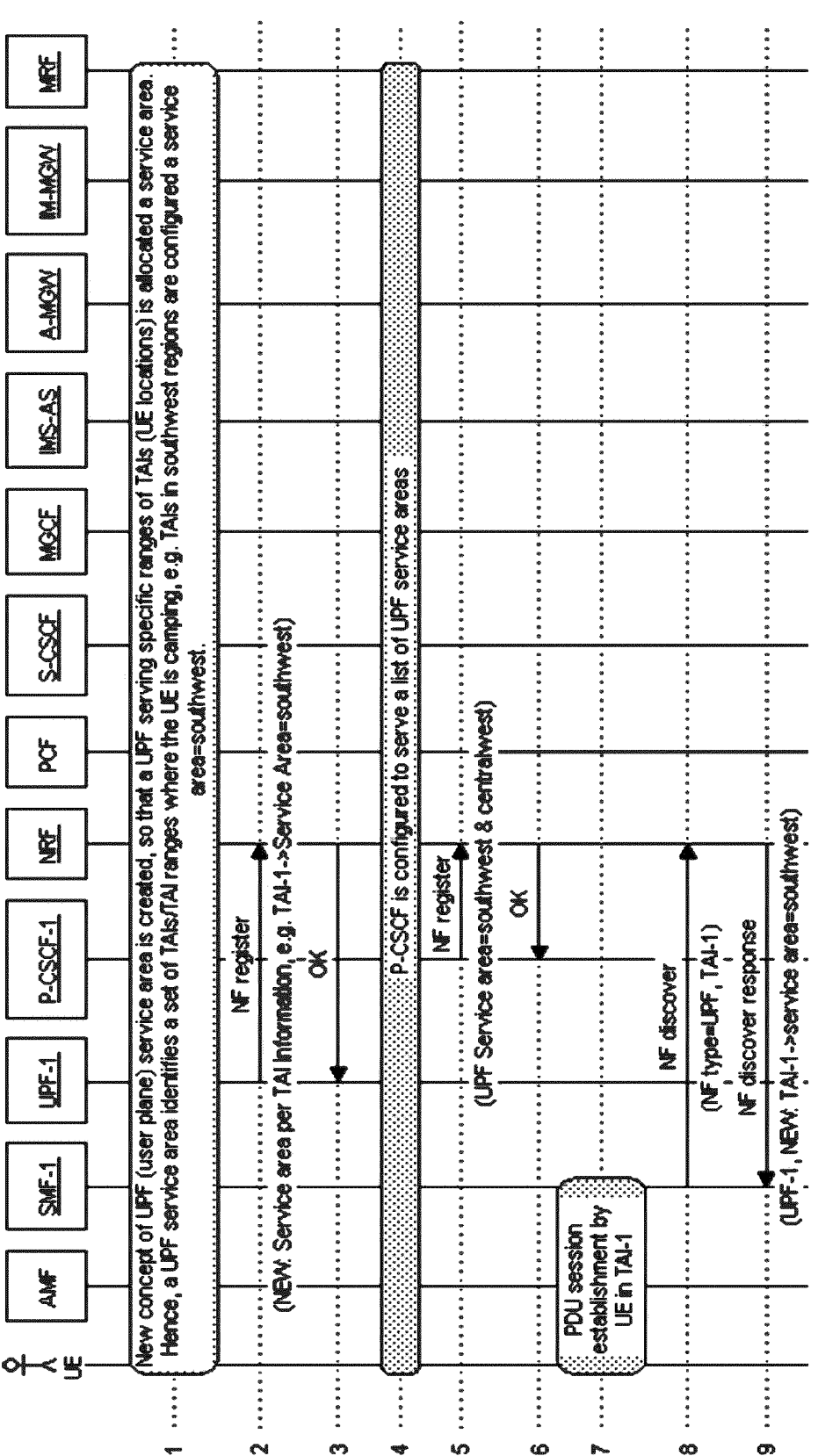
FIG. 8A-8E is a signalling diagram illustrating an example implementation of the methods of FIGS. 2 to 7.

In step 1 of FIG. 8A a new concept of a UPF geographical service area is created.

In step 2 of FIG. 8A, the UPF-1 transmits a registration request to register its UPF profile at the NRF. As part of the UPF profile, the UPF-1 additionally registers the geographical service area associated to the TAI, e.g.

upfInfo entry 1→TAI range=1-100, priority=1, service
      area=southwest
    upfInfo entry 2→TAI range=101-200, priority=2, service
      area=south
    upfInfo entry 3→TAI range=201-300, priority=3, service
      area=central In step 3 of FIG. 8A, the NRF acknowledges the registration.

In step 4 of FIG. 8A, the P-CSCF is configured to service a list of UPF service areas.

In step 5 of FIG. 8A, the P-CSCF registers its P-CSCF profile in the NRF. The P-CSCF profile comprises the one or more geographical service areas served by P-CSCF. For example:

P-CSCF profile→service area=southwest, central, west

In step 6 of FIG. 8A, the NRF acknowledges the registration request.

In step 7 of FIG. 8A, PDU session establishment is performed by a UE in TAI-1.

In step 8 of FIG. 8A, the SMF-1 transmits a discovery request to the NRF for UPFs serving the TAI where the UE is camping (e.g. TAI=100).

In step 9 of FIG. 8A, the NRF returns one or more UPF identifications that service TAI=100. The NRF also includes the geographical service area served by each UPF.

Figure 8B:
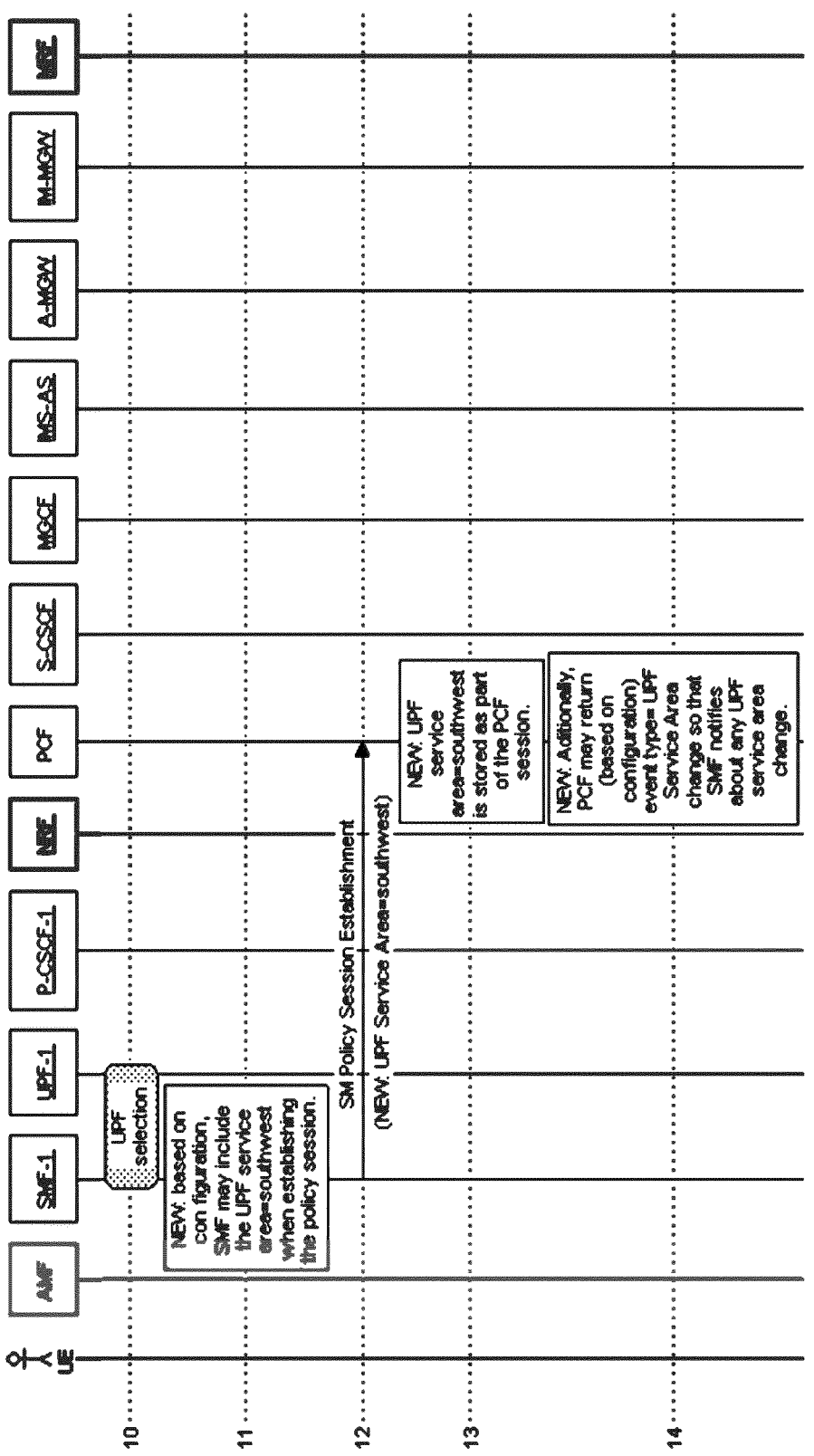

In step 10 of FIG. 8B, the sMF-1 selects UPF-1. The geographical service area determined by SMF for the UPF-1 for TAI=100 is southwest, which is also the primary service area for the UPF-1 (priority=1). If the selected UPF serves several service areas (as shown in steps 1-3 above), the SMF includes the primary service area (as indicated by the priority) of the selected UPF.

In step 11 of FIG. 8B, the SMF includes (based on local policy) the geographical service area of the UPF-1 when contacting PCF for SM policy authorization.

In step 12 of FIG. 8B, the SMF transmits the SM policy session establishment message to the PCF.

In step 13 of FIG. 8B, the PCF stores this geographical service area (southwest) as part of the session.

Figure 8C:
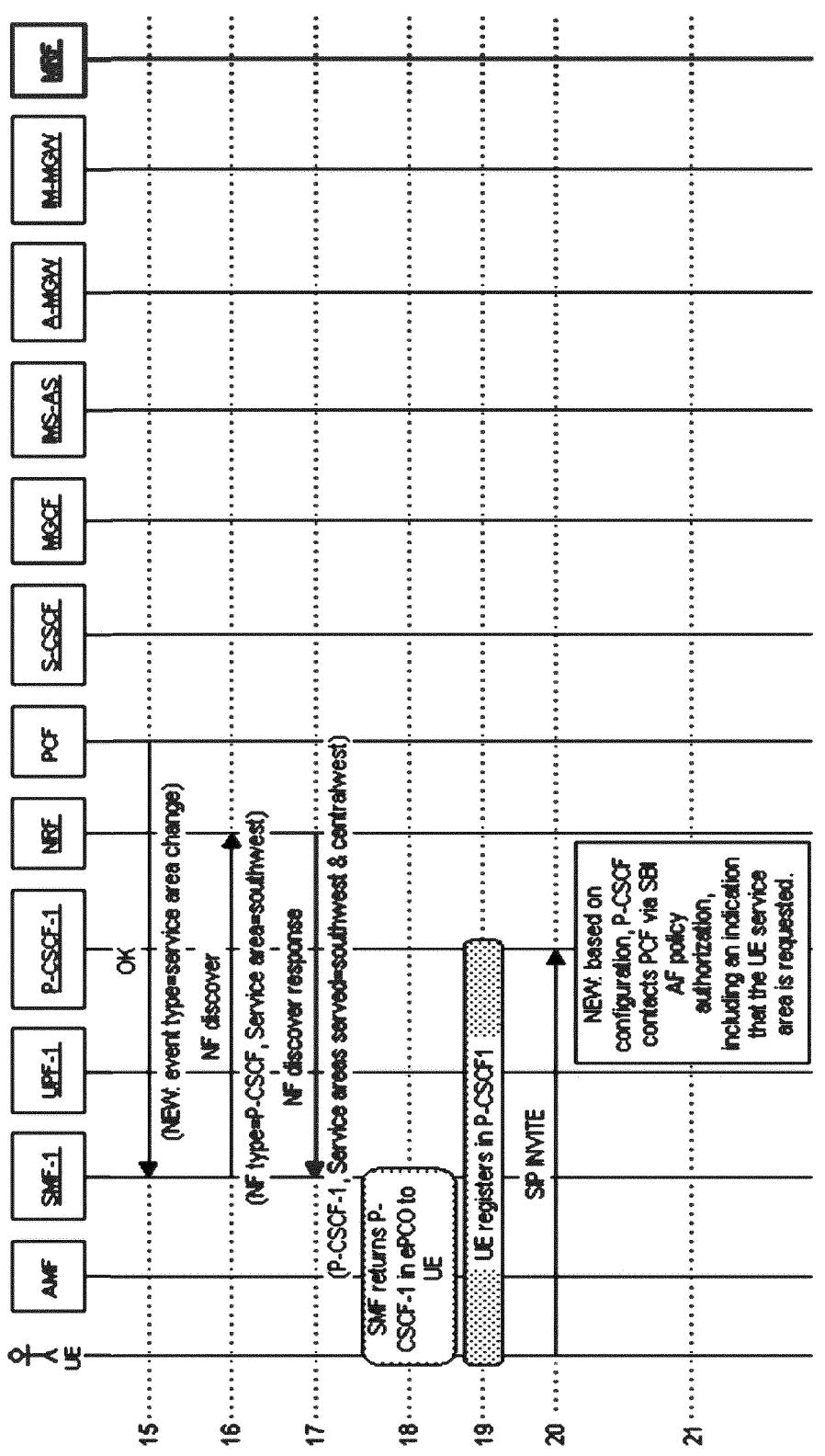

In steps 14 and 15 of FIG. 8B-8C, the PCF may, based on local policy, transmits a request for an update to "UPF service area change" to the SMF in order to receive notifications from the SMF when the UPF service area changes.

In step 16 of FIG. 8C, the SMF transmits a discovery request to the NRF for one or more P-CSCFs serving the geographical service area (e.g. southwest).

In step 17 of FIG. 8C, the NRF returns the one or more P-CSCFs serving the geographical service area to the SMF.

In step 18 of FIG. 8C, the SMF returns the one or more P-CSCF addresses to the UE.

In step 19 of FIG. 8C, the UE registers in IMS (for example, using the first P-CSCF address returned by SMF).

In step 20 of FIG. 8C, the user of the UE initiates an IMS/SIP voice/video call. Ths SIP invite is transmitted to the P-CSCF1.

Figure 8D:
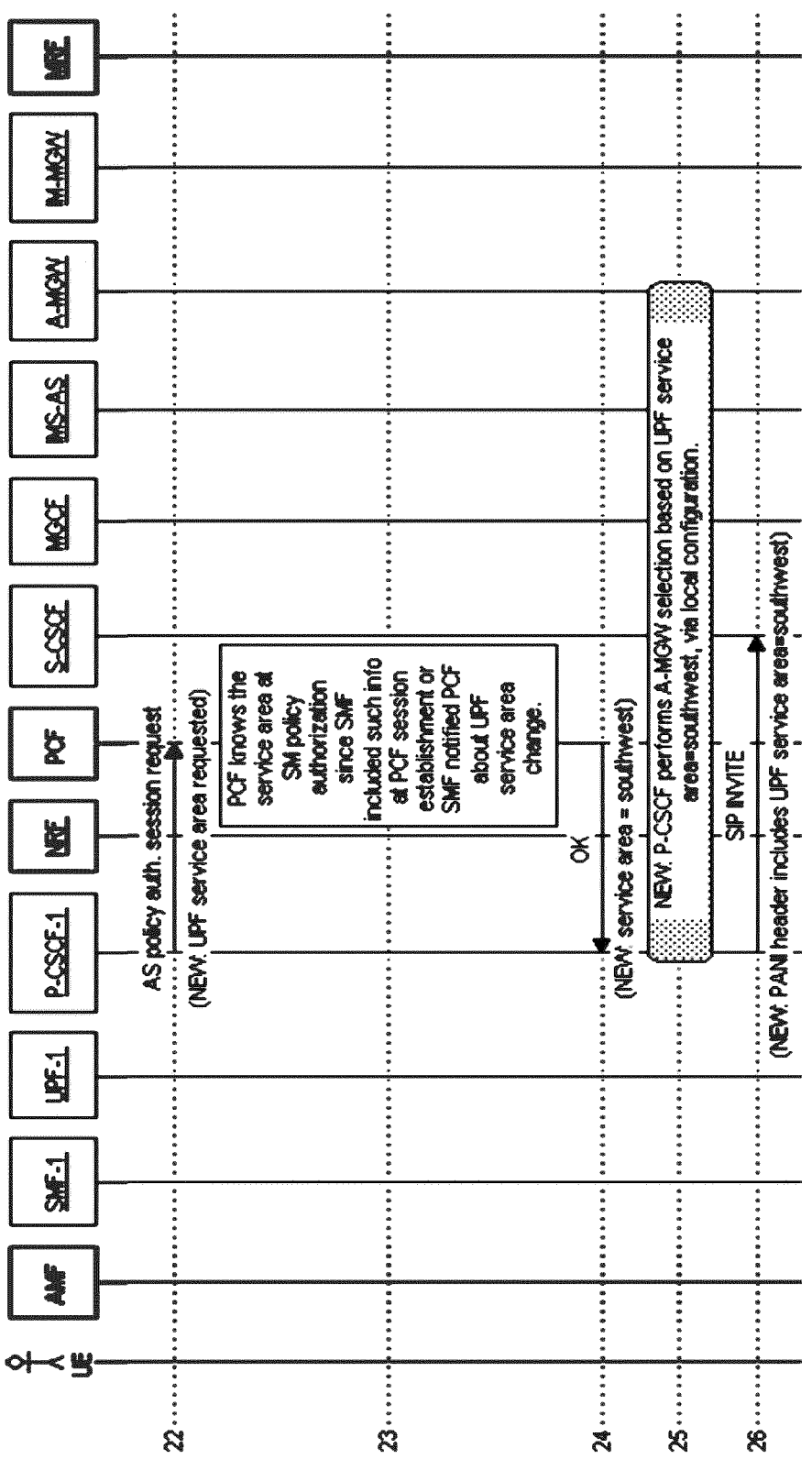

In steps 21 and 22 of FIG. 8C-8D, based on local policy (e.g. P-CSCF1 supports the selection of A-MGW closer to the UPF service area), the P-CSCF1 initiates an AF policy authorization request towards the PCF (for example, as defined in 3GPP TS 29.514, Npcf_PolicyAuthorization_ Create operation). The request comprises an indication that the geographical service area of the current UPF for the IP session is requested.

In steps 23 and 24 of FIG. 8D, the PCF returns the geographical service area of the UPF which was previously stored in Step 13 above or updated based on the PCF subscribing to geographical service area change reporting. Alternatively, the PCF may obtain this information from the SMF upon P-CSCF request (immediate reporting request).

In step 25 of FIG. 8D, the P-CSCF selects an A-MGW based on local configuration, e.g. Service area=southwest, A-MGW=AMGW-1 (primary) & AMGW-2 (secondary). The A-MGW may be used for routing media traffic.

In step 26 of FIG. 8D, Before forwarding the SIP INVITE, P-CSCF adds a new SIP header (or add a new attribute in the existing SIP PANI header, if location information was also requested in step 22) with the value of the UPF service area, e.g.

New SIP header→Service-Area: southwest

PANI header enhanced→P-Access-Network-Info: 3GPP-NR;nr-cell-id-3gpp=C359A3913B20E;service-area=southwest The SIP Invite is then forwarded to the S-CSCF.

Steps 27 to 29 described a first alternative routing of the call, and steps 30 to 33 described a second alternative routing of the call.

Figure 8E:
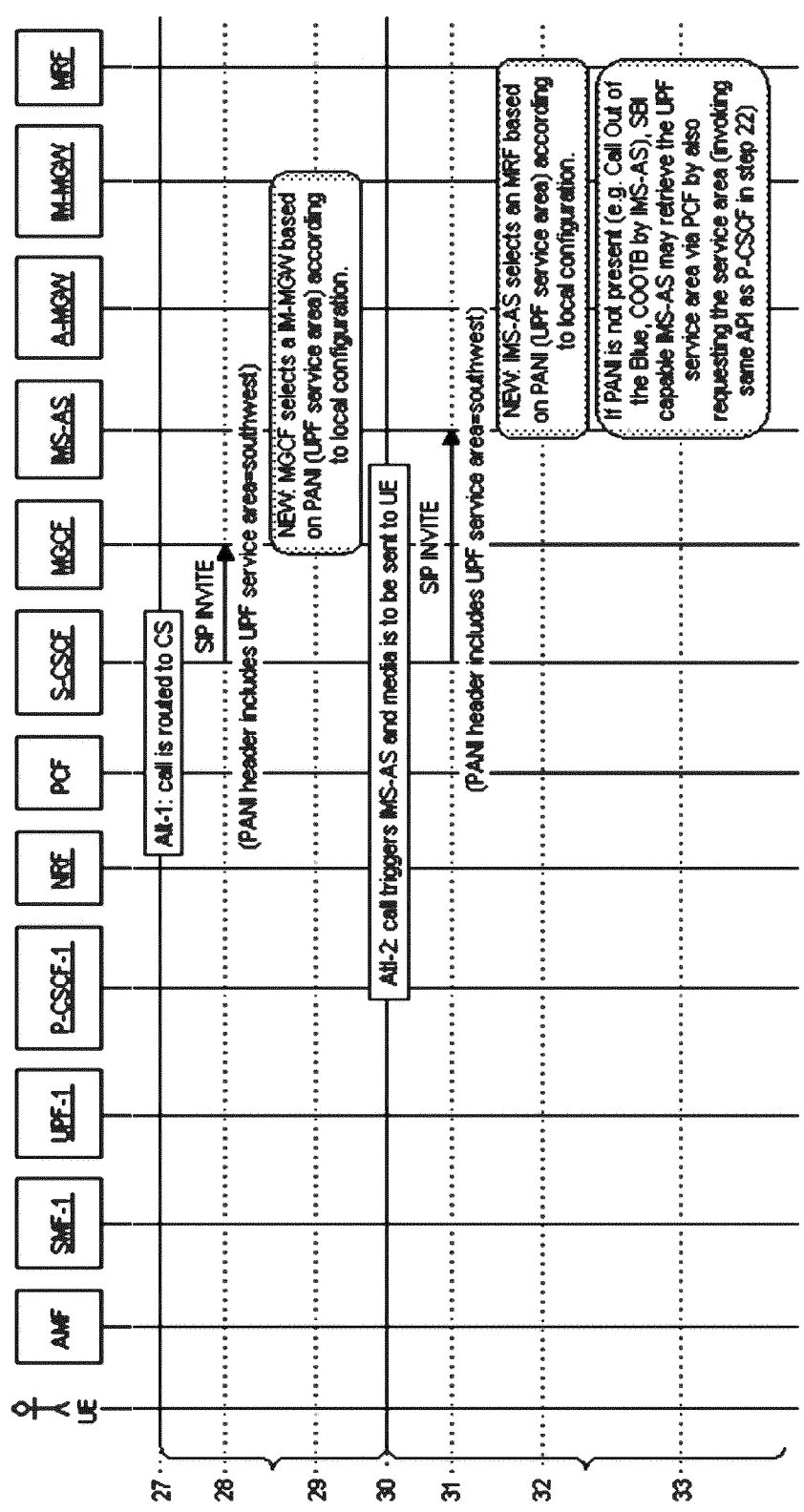

In step 27 of FIG. 8E, the call is routed to a Circuit Switched (CS) network.

In step 28 of FIG. 8E, the SIP INVITE forwarded to a Media Gateway Control Function, MGCF.

In step 29 of FIG. 8E, the MGCF selects the IM-MGW instance based on the geographical service area in the PANI header.

In step 30 of FIG. 8E, the call tiggers the IMS-AS and media is to be sent to the UE.

In step 31 of FIG. 8E, the SIP INITE is forwarded to the IMS-AS.

In step 32 of FIG. 8E, the IMS-AS selects the MRF based on the geographical service area in the PANI header.

In step 33 of FIG. 8E, if the PANI is not present (e.g. Call out of the blue, COOTB in IMS-AS) an SBI capable IMS-AS may retrieve the geographical service area via the PCF by also requesting the geographical service area (invoking same API as P-CSCF in Step 22).

Figure 9:
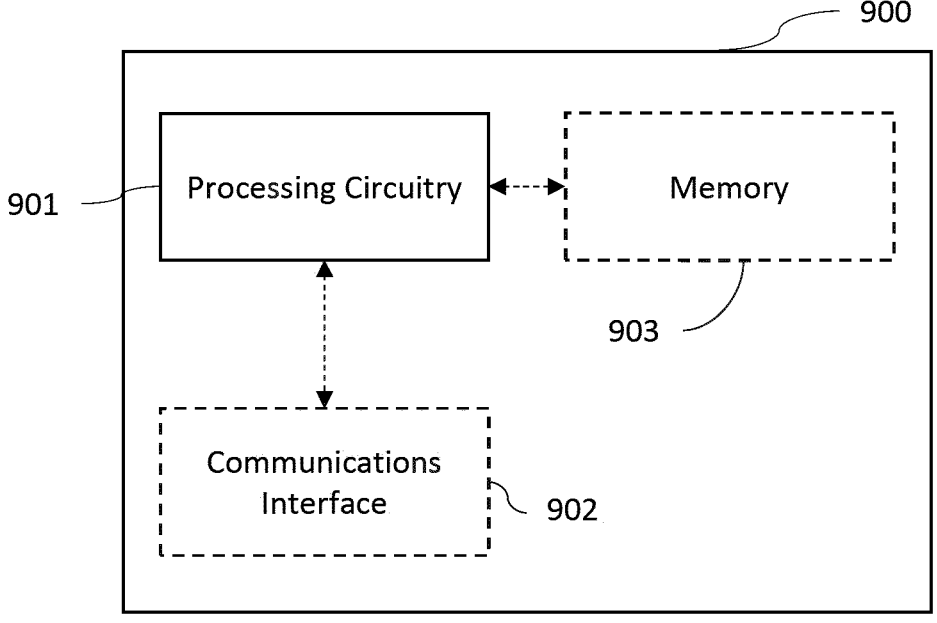
FIG. 9 illustrates a user plane function (UPF) comprising processing circuitry (or logic)

FIG. 9 illustrates a user plane function (UPF) 900 comprising processing circuitry (or logic) 901. The processing circuitry 901 controls the operation of the UPF 900 and can implement the method described herein in relation to an UPF 900. The processing circuitry 901 can comprise one or more processors, processing units, multi-core processors or modules that are configured or programmed to control the UPF 900 in the manner described herein. In particular implementations, the processing circuitry 901 can comprise a plurality of software and/or hardware modules that are each configured to perform, or are for performing, individual or multiple steps of the method described herein in relation to the UPF 900.

Briefly, the processing circuitry 901 of the UPF 900 is configured to: register a profile for the UPF at a network repository function, NRF, wherein the profile comprises an indication of one or more geographical service areas served by the UPF, wherein one or more tracking area identifiers served by the UPF are associated with each of the one or more geographical service areas.

In some embodiments, the UPF 900 may optionally comprise a communications interface 902. The communications interface 902 of the UPF 900 can be for use in communicating with other nodes, such as other virtual nodes. For example, the communications interface 902 of the UPF 900 can be configured to transmit to and/or receive from other nodes requests, resources, information, data, signals, or similar. The processing circuitry 901 of UPF 900 may be configured to control the communications interface 902 of the UPF 900 to transmit to and/or receive from other nodes requests, resources, information, data, signals, or similar.

Optionally, the UPF 900 may comprise a memory 903. In some embodiments, the memory 903 of the UPF 900 can be configured to store program code that can be executed by the processing circuitry 901 of the UPF 900 to perform the method described herein in relation to the UPF 900. Alternatively, or in addition, the memory 903 of the UPF 900, can be configured to store any requests, resources, information, data, signals, or similar that are described herein. The processing circuitry 901 of the UPF 900 may be configured to control the memory 903 of the UPF 900 to store any requests, resources, information, data, signals, or similar that are described herein.

Figure 10:
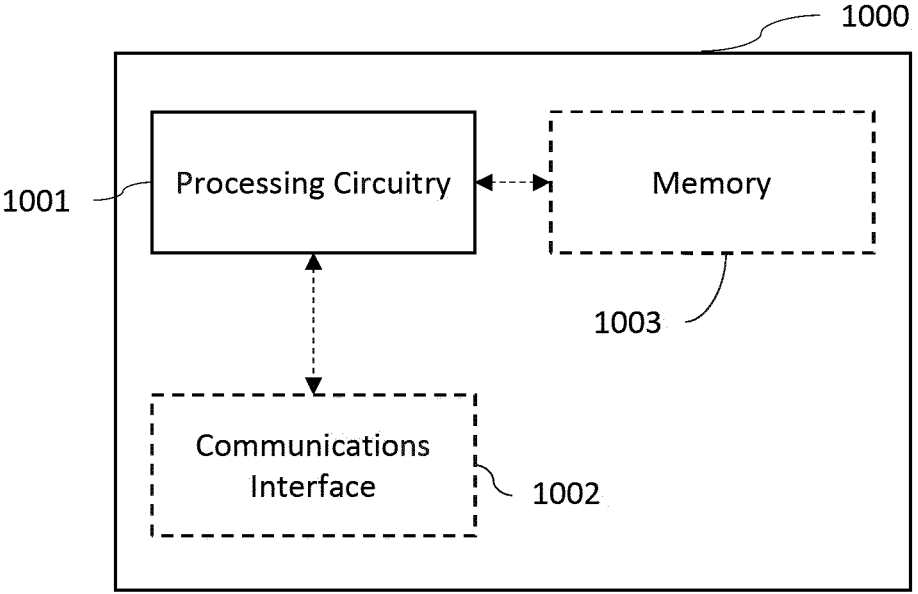
FIG. 10 illustrates a session management function (SMF) comprising processing circuitry (or logic)

FIG. 10 illustrates a session management function (SMF) 1000 comprising processing circuitry (or logic) 1001. The processing circuitry 1001 controls the operation of the SMF 1000 and can implement the method described herein in relation to an SMF 1000. The processing circuitry 1001 can comprise one or more processors, processing units, multi-core processors or modules that are configured or programmed to control the SMF 1000 in the manner described herein. In particular implementations, the processing circuitry 1001 can comprise a plurality of software and/or hardware modules that are each configured to perform, or are for performing, individual or multiple steps of the method described herein in relation to the SMF 1000.

Briefly, the processing circuitry 1001 of the SMF 1000 is configured to: responsive to establishing a Protocol Data Unit (PDU) session with a wireless device, transmit a request to a Network Repository Function for an indication of a User Plane Function serving a tracking area identifier associated with the wireless device; and responsive to establishing a PDU session with a wireless device, transmit a request to a Network Repository Function for an indication of a User Plane Function serving a tracking area identifier associated with the wireless device.

In some embodiments, the SMF 1000 may optionally comprise a communications interface 1002. The communications interface 1002 of the SMF 1000 can be for use in communicating with other nodes, such as other virtual nodes. For example, the communications interface 1002 of the SMF 1000 can be configured to transmit to and/or receive from other nodes requests, resources, information, data, signals, or similar. The processing circuitry 1001 of SMF 1000 may be configured to control the communications interface 1002 of the SMF 1000 to transmit to and/or receive from other nodes requests, resources, information, data, signals, or similar.

Optionally, the SMF 1000 may comprise a memory 1003. In some embodiments, the memory 1003 of the SMF 1000 can be configured to store program code that can be executed by the processing circuitry 1001 of the SMF 1000 to perform the method described herein in relation to the SMF 1000. Alternatively, or in addition, the memory 1003 of the SMF 1000, can be configured to store any requests, resources, information, data, signals, or similar that are described herein. The processing circuitry 1001 of the SMF 1000 may be configured to control the memory 1003 of the SMF 1000 to store any requests, resources, information, data, signals, or similar that are described herein.

Figure 11:
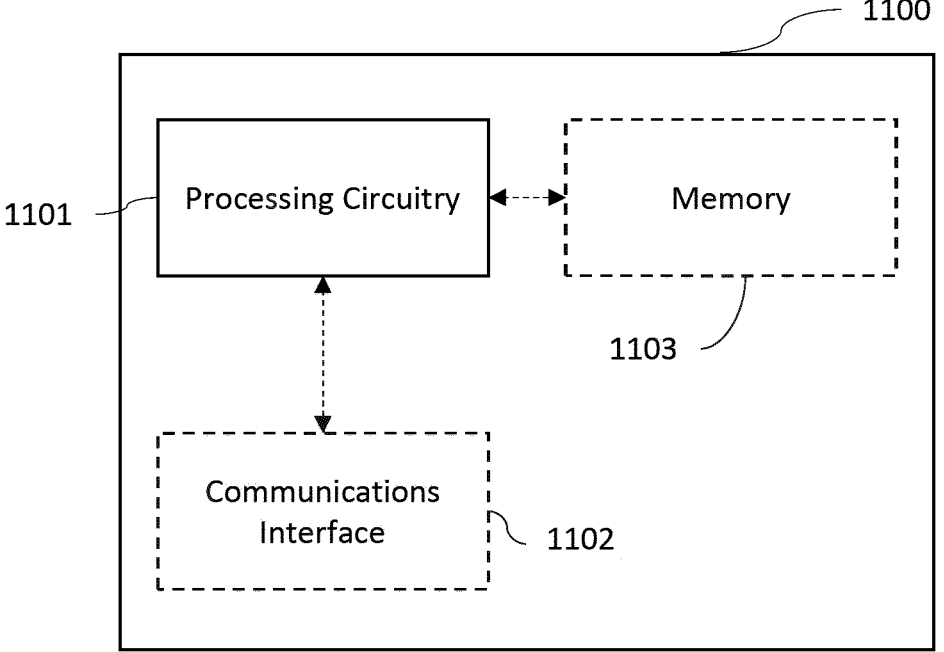
FIG. 11 illustrates a Policy Control Function (PCF) comprising processing circuitry (or logic)

FIG. 11 illustrates a Policy Control Function (PCF) 1100 comprising processing circuitry (or logic) 1101. The processing circuitry 1101 controls the operation of the PCF 1100 and can implement the method described herein in relation to an PCF 1100. The processing circuitry 1101 can comprise one or more processors, processing units, multi-core processors or modules that are configured or programmed to control the PCF 1100 in the manner described herein. In particular implementations, the processing circuitry 1101 can comprise a plurality of software and/or hardware modules that are each configured to perform, or are for performing, individual or multiple steps of the method described herein in relation to the PCF 1100.

Briefly, the processing circuitry 1101 of the PCF 1100 is configured to: receive, from a session management function, SMF, an indication of a first geographical area served by a first UPF to be used in the IP session; store an indication of the first geographical service area; receive a request from a Proxy-Call Session Control Function, P-CSCF, for a geographical area associated with the IP session; and responsive to receiving the request, transmit an indication of the first geographical service area to the P-CSCF.

In some embodiments, the PCF 1100 may optionally comprise a communications interface 1102. The communications interface 1102 of the PCF 1100 can be for use in communicating with other nodes, such as other virtual nodes. For example, the communications interface 1102 of the PCF 1100 can be configured to transmit to and/or receive from other nodes requests, resources, information, data, signals, or similar. The processing circuitry 1101 of PCF 1100 may be configured to control the communications interface 1102 of the PCF 1100 to transmit to and/or receive from other nodes requests, resources, information, data, signals, or similar.

Optionally, the PCF 1100 may comprise a memory 1103. In some embodiments, the memory 1103 of the PCF 1100 can be configured to store program code that can be executed by the processing circuitry 1101 of the PCF 1100 to perform the method described herein in relation to the PCF 1100. Alternatively, or in addition, the memory 1103 of the PCF 1100, can be configured to store any requests, resources, information, data, signals, or similar that are described herein. The processing circuitry 1101 of the PCF 1100 may be configured to control the memory 1103 of the PCF 1100 to store any requests, resources, information, data, signals, or similar that are described herein.

Figure 12:
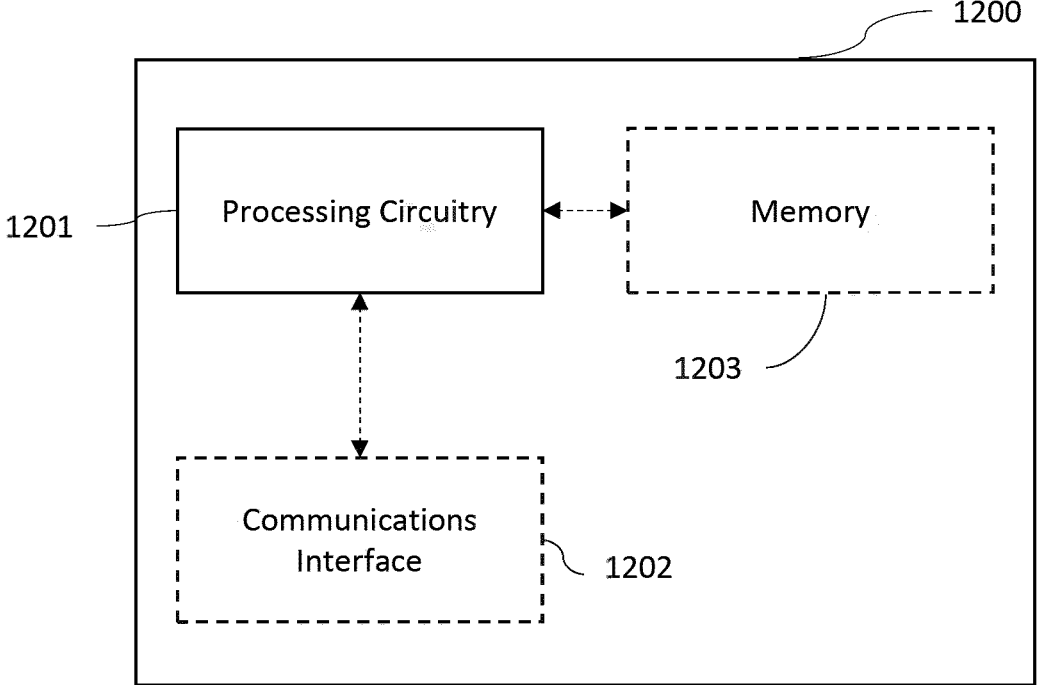
FIG. 12 illustrates a Proxy-Call Session Control Function (P-CSCF) 1200 comprising processing circuitry (or logic)

FIG. 12 illustrates a Proxy-Call Session Control Function (P-CSCF) 1200 comprising processing circuitry (or logic) 1201. The processing circuitry 1201 controls the operation of the P-CSCF 1200 and can implement the method described herein in relation to an P-CSCF 1200. The processing circuitry 1201 can comprise one or more processors, processing units, multi-core processors or modules that are configured or programmed to control the P-CSCF 1200 in the manner described herein. In particular implementations, the processing circuitry 1201 can comprise a plurality of software and/or hardware modules that are each configured to perform, or are for performing, individual or multiple steps of the method described herein in relation to the P-CSCF 1200.

Briefly, the processing circuitry 1201 of the P-CSCF 1200 is configured to: receive one or more Session Initiation Protocol, SIP, packets originating from a wireless device as part of the IP session; responsive to receiving the SIP packets, transmit a request to a Policy Control Function, PCF, for an indication of a geographical service area for a User Plane Function, UPF associated with the IP session; receive an indication of the geographical service area; and select a gateway node based on the geographical service area.

In some embodiments, the P-CSCF 1200 may optionally comprise a communications interface 1202. The communications interface 1202 of the P-CSCF 1200 can be for use in communicating with other nodes, such as other virtual nodes. For example, the communications interface 1202 of the P-CSCF 1200 can be configured to transmit to and/or receive from other nodes requests, resources, information, data, signals, or similar. The processing circuitry 1201 of P-CSCF 1200 may be configured to control the communications interface 1202 of the P-CSCF 1200 to transmit to and/or receive from other nodes requests, resources, information, data, signals, or similar.

Optionally, the P-CSCF 1200 may comprise a memory 1203. In some embodiments, the memory 1203 of the P-CSCF 1200 can be configured to store program code that can be executed by the processing circuitry 1201 of the P-CSCF 1200 to perform the method described herein in relation to the P-CSCF 1200. Alternatively, or in addition, the memory 1203 of the P-CSCF 1200, can be configured to store any requests, resources, information, data, signals, or similar that are described herein. The processing circuitry 1201 of the P-CSCF 1200 may be configured to control the memory 1203 of the P-CSCF 1200 to store any requests, resources, information, data, signals, or similar that are described herein.

Figure 13:
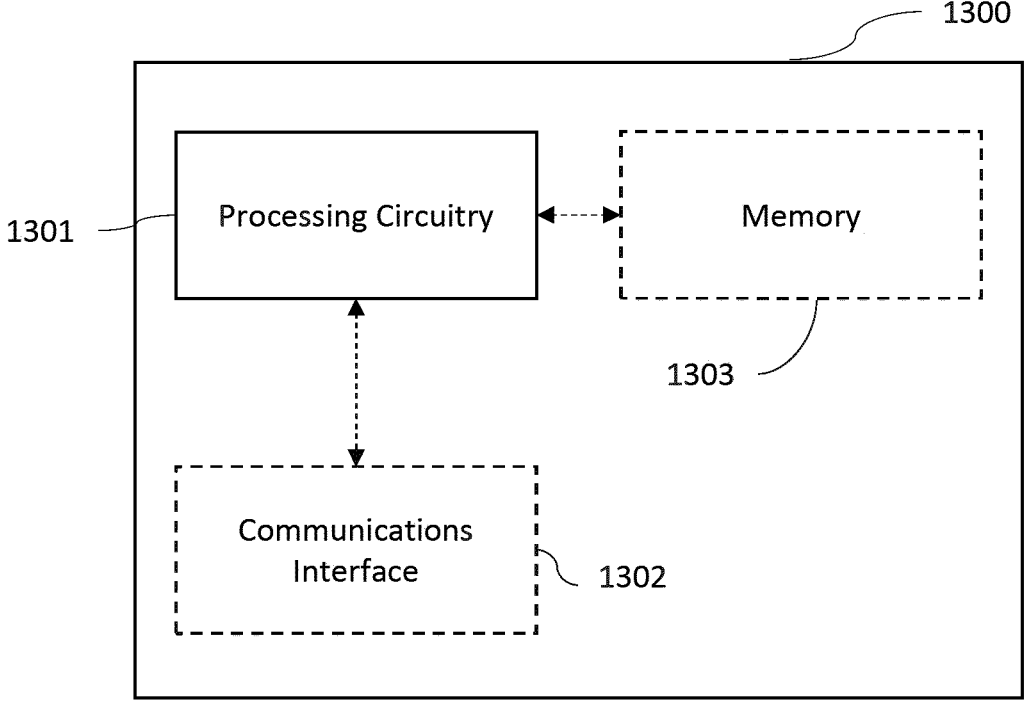
FIG. 13 illustrates a first Network Function (NF) 1300 comprising processing circuitry (or logic)

FIG. 13 illustrates a first Network Function (NF) 1300 comprising processing circuitry (or logic) 1301. The processing circuitry 1301 controls the operation of the first NF 1300 and can implement the method described herein in relation to a first NF 1300. The processing circuitry 1301 can comprise one or more processors, processing units, multi-core processors or modules that are configured or programmed to control the first NF 1300 in the manner described herein. In particular implementations, the processing circuitry 1301 can comprise a plurality of software and/or hardware modules that are each configured to perform, or are for performing, individual or multiple steps of the method described herein in relation to the first NF 1300.

Briefly, the processing circuitry 1301 of the first NF 1300 is configured to: receive one or more Session Initiation Protocol, SIP packets as part of an IP session; obtain an indication of a geographical service area served by a current User Plane Function, UPF, associated with the IP session; select a media resource function or a media gateway based on the geographical service area; and initiate forwarding of one or more media packets to the selected media resource function or the media gateway.

In some embodiments, the first NF 1300 may optionally comprise a communications interface 1302. The communications interface 1302 of the first NF 1300 can be for use in communicating with other nodes, such as other virtual nodes. For example, the communications interface 1302 of the first NF 1300 can be configured to transmit to and/or receive from other nodes requests, resources, information, data, signals, or similar. The processing circuitry 1301 of first NF 1300 may be configured to control the communications interface 1302 of the first NF 1300 to transmit to and/or receive from other nodes requests, resources, information, data, signals, or similar.

Optionally, the first NF 1300 may comprise a memory 1303. In some embodiments, the memory 1303 of the first NF 1300 can be configured to store program code that can be executed by the processing circuitry 1301 of the first NF 1300 to perform the method described herein in relation to the first NF 1300. Alternatively, or in addition, the memory 1303 of the first NF 1300, can be configured to store any requests, resources, information, data, signals, or similar that are described herein. The processing circuitry 1301 of the first NF 1300 may be configured to control the memory 1303 of the first NF 1300 to store any requests, resources, information, data, signals, or similar that are described herein.

Figure 14:
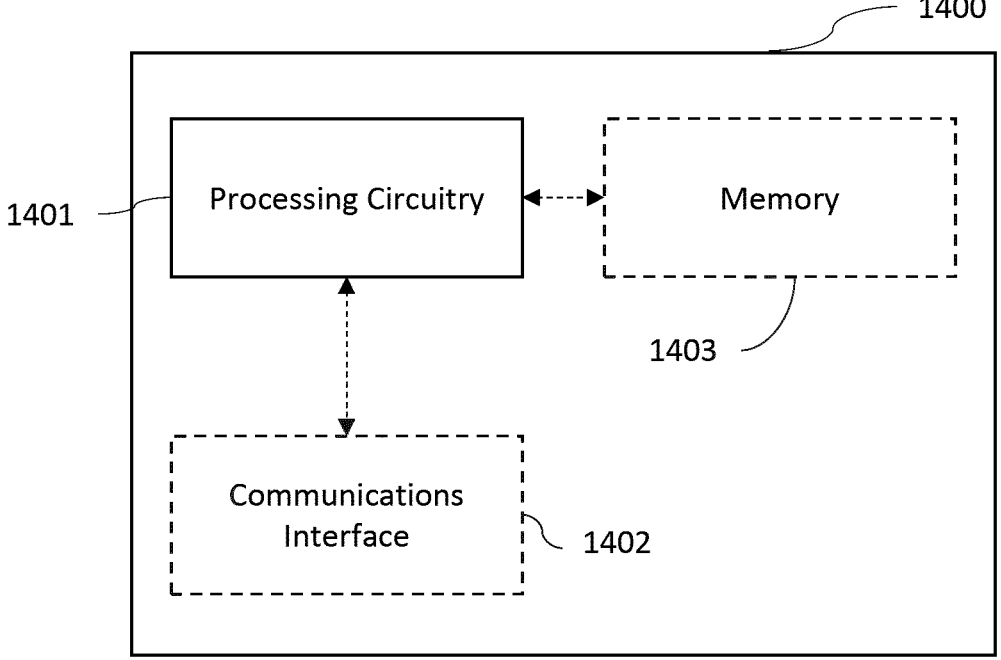
FIG. 14 illustrates a Network Repository Function (NRF) 1400 comprising processing circuitry (or logic).

FIG. 14 illustrates a Network Repository Function (NRF) 1400 comprising processing circuitry (or logic) 1401. The processing circuitry 1401 controls the operation of the NRF 1400 and can implement the method described herein in relation to a NRF 1400. The processing circuitry 1401 can comprise one or more processors, processing units, multi-core processors or modules that are configured or programmed to control the NRF 1400 in the manner described herein. In particular implementations, the processing circuitry 1401 can comprise a plurality of software and/or hardware modules that are each configured to perform, or are for performing, individual or multiple steps of the method described herein in relation to the NRF 1400.

Briefly, the processing circuitry 1401 of the NRF 1400 is configured to: receive a first profile of a user plane function, UPF, wherein the profile comprises an indication of one or more geographical service areas served by the UPF, wherein one or more tracking area identifiers, TAIs, served by the UPF are associated with each of the one or more geographical service areas; and store the first profile of the UPF.

In some embodiments, the NRF 1400 may optionally comprise a communications interface 1402. The communications interface 1402 of the NRF 1400 can be for use in communicating with other nodes, such as other virtual nodes. For example, the communications interface 1402 of the NRF 1400 can be configured to transmit to and/or receive from other nodes requests, resources, information, data, signals, or similar. The processing circuitry 1401 of NRF 1400 may be configured to control the communications interface 1402 of the NRF 1400 to transmit to and/or receive from other nodes requests, resources, information, data, signals, or similar.

Optionally, the NRF 1400 may comprise a memory 1403. In some embodiments, the memory 1403 of the NRF 1400 can be configured to store program code that can be executed by the processing circuitry 1401 of the NRF 1400 to perform the method described herein in relation to the NRF 1400. Alternatively, or in addition, the memory 1403 of the NRF 1400, can be configured to store any requests, resources, information, data, signals, or similar that are described herein. The processing circuitry 1401 of the NRF 1400 may be configured to control the memory 1403 of the NRF 1400 to store any requests, resources, information, data, signals, or similar that are described herein.

Embodiments described herein have the following advantages:

They allow optimal routing of IMS media and signaling traffic, e.g. having into account the UPF instance handling the UE's PDU session when the IMS/SIP voice/video call is initiated.

They decrease and simplify substantially the configuration in IMS nodes by allowing IMS nodes to be aware of the current UPF geographical service area (not the UPF locality, as hinted in 3GPP, since there may be several UPFs in the same locality/data center, but serving different service areas)

They have zero impact in diameter legacy protocols (e.g. Cx, Sh), which are soon to be deprecated in favour of SBI (HTTP protocol)

They have zero impact on S-CSCF/HSS/UDM (opposite to the current proposal in 3GPP, which impacts all of them), which are not control plane/user plane NFs.

They avoid impacting the configuration in IMS nodes in a non-scalable way, since every time a new UPF in instantiated in the network, the different IMS nodes do not need to be reconfigured with the new UPF id, when eventually the service areas served by UPFs remain the same when it comes to select the MGWs/MRFs. In large networks, multiple UPFs serve the same geographical areas, so in reality it does matter to have one or ten UPFs in the same area, the MGWs/MRFs selection will not be impacted by the amount of UPF instances Ids in the same area. IMS nodes should be transparent to the scalability of UPFs within the same geographical area.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a Proxy-Call Session Control Function, P-CSCF, for selecting a media gateway node for an IP session, the method comprising:
  receiving one or more Session Initiation Protocol, SIP, packets originating from a wireless device as part of the IP session;
  responsive to receiving the SIP packets, transmitting a request to a Policy Control Function, PCF, for an indication of a geographical service area for a User Plane Function, UPF associated with the IP session;
  receiving an indication of the geographical service area; and
  selecting a gateway node based on the geographical service area.

2. The method as in claim 1 further comprising: registering a profile for the P-CSCF at a network repository function, NRF, wherein the profile comprises an indication of one or more geographical areas served by the P-CSCF.

3. The method as in claim 1 further comprising: including the indication of the geographical service area in a header of the SIP packets; and forwarding the SIP packets to a S-CSCF.

4. A method performed by an Internet Protocol (IP) Multimedia Subsystem (IMS) network function, the method comprising:
  receiving one or more Session Initiation Protocol, SIP packets as part of an IP session;
  obtaining, from a Policy Control Function, PCF, an indication of a geographical service area served by a current User Plane Function, UPF, associated with the IP session;
  selecting a media resource function or a media gateway based on the geographical service area; and
  initiating forwarding of one or more media packets to the selected media resource function or media gateway.

5. The method as in claim 4 wherein the step of obtaining comprises: receiving the indication of the geographical service area in a header of the one or more Session Initiation Protocol packets.

6. The method as claimed in claim 4 wherein the step of obtaining comprises: obtaining the indication of the geographical service area from a Policy Control Function, PCF.

7. A method performed by a Session Management Function, SMF, for enabling selection of a media resource function or a media gateway in an IP session, the method comprising:
  responsive to establishing a PDU session with a wireless device, transmitting a request to a Network Repository Function for an indication of a User Plane Function serving a tracking area identifier associated with the wireless device; and responsive to transmitting the request, receiving an identification of at least one UPF and respective indications of geographical service areas served by the at least one UPF.

8. The method as in claim 7 further comprising: selecting a first UPF from the at least one UPF to be used for the IP session with the wireless device; and transmitting an indication of a first geographical area served by the first UPF to a Policy Control Function, PCF.

9. The method as in claim 8 further comprising: receiving a request from the PCF to provide an update to the PCF if a change in geographical service area associated with the IP session occurs; and responsive to a change in geographical service area for the IP session occurring, updating the PCF.

10. A method performed by a Policy Control Function, PCF for enabling selection of a media resource function or a media gateway in an IP session, the method comprising:

receiving, from a session management function, SMF, an indication of a first geographical area served by a first UPF to be used in the IP session;

storing an indication of the first geographical service area;

receiving a request from a Proxy-Call Session Control Function, P-CSCF, for a geographical area associated with the IP session; and responsive to receiving the request, transmitting an indication of the first geographical service area to the P-CSCF.

11. The method as in claim 10 further comprising transmitting a request to the SMF to provide an update if a change in geographical service area for the IP session occurs; and responsive to a change in geographical service area for the IP session occurring, receiving an updated geographical service area from the SMF; and updating the first geographical service area with the updated geographical service area.

12. A method performed by a user plane function, UPF, for enabling selection of a media resource function or a media gateway in an IP session, the method comprising:

registering a profile for the UPF at a network repository function, NRF, wherein the profile comprises an indication of one or more geographical service areas served by the UPF, wherein one or more tracking area identifiers served by the UPF are associated with each of the one or more geographical service areas.

13. The method as claimed in claim 12 wherein the profile further comprises an indication of a priority associated with each of the one or more geographical service areas.

14. A method performed by a network repository function, NRF, for enabling selection of a media resource function or a media gateway in an IP session, the method comprising:

receiving a first profile of a user plane function, UPF, wherein the profile comprises an indication of one or more geographical service areas served by the UPF, wherein one or more tracking area identifiers, TAIs, served by the UPF are associated with each of the one or more geographical service areas; and storing the first profile of the UPF.

15. The method of claim 14 further comprising: receiving a discovery request for a UPF from a session management function comprising an indication of a first TAI; determining one or more UPFs capable of serving the first TAI based on stored profiles; and transmitting an indication of each of the one or more UPFs to the SMF along with an indication of one or more geographical service areas served by each of the one or more UPFs.

16. The method of claim 14 further comprising: receiving a second profile of a Proxy-Call Session Control Function, P-CSCF, wherein the second profile comprises an indication of one or more geographical areas served by the P-CSCF; and storing the second profile.

17. The method of claim 16 further comprising: receiving a discovery request for a Proxy-Call Session Control Function, P-CSCF, from a session management function, SMF, comprising an indication of first geographical service area; determining one or more P-CSCFs capable of serving the first geographical service area based on stored profiles; and transmitting an indication of each of the one or more P-CSCFs to the SMF along with an indication of one or more geographical service areas served by each of the one or more P-CSCFs.

* * * * *